(12) United States Patent
Nagafuchi (10) Patent No.: US 8,469,777 B2
(45) Date of Patent: Jun. 25, 2013

(54) LINEAR ABRASIVE BRUSH MEMBER, METHOD FOR PREPARING LINEAR ABRASIVE BRUSH MEMBER, AND ABRASIVE BRUSH

(75) Inventor: Naohiro Nagafuchi, Tokyo (JP)

(73) Assignee: 3M Innovative Properties Company, St. Paul, MN (US)

(*) Notice: Subject to any disclaimer, the term of this patent is extended or adjusted under 35 U.S.C. 154(b) by 514 days.

(21) Appl. No.: 12/673,090

(22) PCT Filed: Sep. 5, 2008

(86) PCT No.: PCT/US2008/075307
§ 371 (c)(1),
(2), (4) Date: Jun. 9, 2010

(87) PCT Pub. No.: WO2009/032964
PCT Pub. Date: Mar. 12, 2009

(65) Prior Publication Data
US 2012/0028552 A1    Feb. 2, 2012

(30) Foreign Application Priority Data

Sep. 6, 2007   (JP) ................................. 2007-231063

(51) Int. Cl.
*B24B 9/02*   (2006.01)

(52) U.S. Cl.
USPC ........... 451/464; 451/469; 451/465; 451/466; 15/180; 15/183; 428/298.1

(58) Field of Classification Search
USPC ......... 451/540, 532, 533, 527, 535, 464–469; 51/298; 428/298.1; 15/179–183, 187, 188; 425/805, 127; 264/243, 174, 275; 300/21
See application file for complete search history.

(56) References Cited

U.S. PATENT DOCUMENTS

| | | | | |
|---|---|---|---|---|
| 2,920,334 A | * | 1/1960 | Keller | 15/187 |
| 3,233,272 A | | 2/1966 | Pambello | |
| 3,280,516 A | * | 10/1966 | Kimmerle | 451/490 |
| 3,969,090 A | * | 7/1976 | Sasena et al. | 451/532 |
| 4,356,587 A | | 11/1982 | Holding | |
| 4,987,633 A | * | 1/1991 | Heneveld | 15/185 |
| 5,554,068 A | * | 9/1996 | Carr et al. | 451/468 |

(Continued)

FOREIGN PATENT DOCUMENTS

| | | |
|---|---|---|
| JP | S42-008296 | 4/1942 |
| JP | 2-23832 | 2/1990 |

(Continued)

OTHER PUBLICATIONS

ASTM D 790-07, "Standard Test Methods for Flexural Properties of Unreinforced and Reinforced Plastics and Electrical Insulating Material", 2007.

*Primary Examiner* — George Nguyen
(74) *Attorney, Agent, or Firm* — Scott A. Baum (57) ABSTRACT

To provide a linear abrasive brush member, in which filament parts are hardly broken, a substrate part is excellent in deformability, and also, abrasion ability is excellent. A linear abrasive brush member comprising: an embedded core material (9); a rod-shaped substrate part (7) having opposite long-narrow upper and bottom faces; and a plurality of filament parts (8) present on the upper surface along the longitudinal direction; and the substrate part and the filament parts being integrally molded from a resin composition.

2 Claims, 10 Drawing Sheets

U.S. PATENT DOCUMENTS

| | | | |
|---|---|---|---|
| 5,588,172 A * | 12/1996 | Biocca | 15/179 |
| 5,915,436 A * | 6/1999 | Johnson et al. | 15/187 |
| 6,125,495 A * | 10/2000 | Berg et al. | 15/183 |
| 6,126,533 A * | 10/2000 | Johnson et al. | 451/527 |
| 6,261,156 B1 * | 7/2001 | Johnson et al. | 451/41 |
| 6,352,471 B1 * | 3/2002 | Bange et al. | 451/527 |
| 6,422,932 B1 * | 7/2002 | Lageson et al. | 451/466 |
| 6,669,531 B1 * | 12/2003 | Shaffer | 451/5 |
| 6,902,399 B2 * | 6/2005 | Mannschedel | 433/141 |
| 7,121,937 B2 * | 10/2006 | Turch et al. | 451/526 |
| 7,347,468 B1 * | 3/2008 | Tidcomb | 294/51 |
| 8,206,201 B2 * | 6/2012 | Fioratti | 451/526 |
| 2004/0148723 A1 * | 8/2004 | Roney et al. | 15/141.2 |
| 2005/0107017 A1 * | 5/2005 | Fioratti | 451/526 |
| 2008/0110779 A1 * | 5/2008 | Fabian | 206/409 |
| 2009/0191798 A1 * | 7/2009 | Koh | 451/59 |

FOREIGN PATENT DOCUMENTS

| | | |
|---|---|---|
| JP | 2005-288073 | 10/2005 |
| WO | WO 93/18891 | 3/1993 |
| WO | WO 96/33638 | 10/1996 |

\* cited by examiner

LINEAR ABRASIVE BRUSH MEMBER, METHOD FOR PREPARING LINEAR ABRASIVE BRUSH MEMBER, AND ABRASIVE BRUSH

CROSS REFERENCE TO RELATED APPLICATIONS

This application is a national stage filing under 35 U.S.C. §371 of PCT/US2008/075307, filed Sep. 5, 2008, which claims priority to Japanese Patent Application No. 2007-231063, filed Sep. 6, 2007, the disclosure of which is incorporated by reference in its/their entirety herein.

TECHNICAL FIELD

The present invention relates to linear abrasive brush members, methods for preparing thereof, and abrasive brushes composed of the members.

BACKGROUND

The term "abrasive brush" refers to an abrasive material which comprises a main body of the brush and a large number of filaments extending from the main body and exerts an abrasive function through rubbing a workpiece with the filaments. The "filament" refers to a fibrous member, which has a small sectional area, and is long and easy to bend.

An abrasive brush may comprise a plurality of members. For example, an abrasive brush may be constituted by fastening a member composed of bundled filaments to a main body having a handle, a mounting part, etc. This is because making a module of filaments apart from a main body will make it easy to vary the shape of an abrasive brush depending on the use thereof. In this specification, a component of an abrasive brush in which filaments are bundled is referred to as an abrasive brush member. A main body to which an abrasive brush member is to be mounted is referred to as a support member.

Figure 20A:
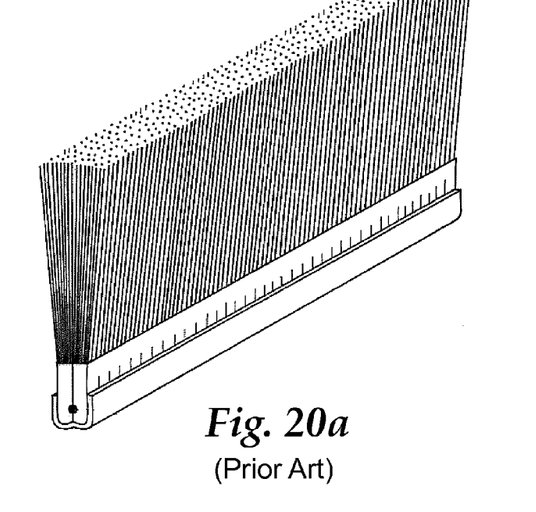
FIG. 20 is a schematic view showing an example of the structure of a conventional linear abrasive brush member.
Figure 20B:
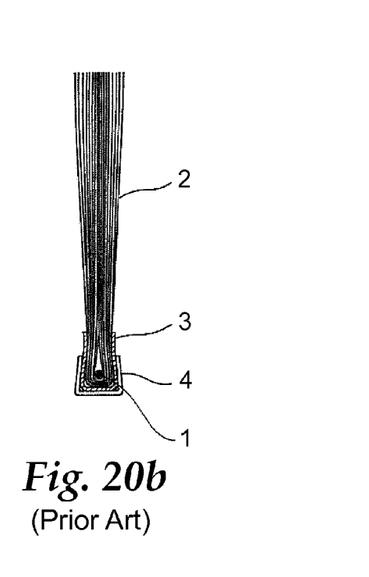

FIG. 20 is a schematic view showing an example of the structure of a conventional linear abrasive brush member, wherein (a) is a perspective view and (b) is a cross-sectional view. With reference to FIG. 20 (b), in a linear abrasive brush member, fibers 2 are folded in half across the core 1 and the folded parts are fastened by caulking with a U-shaped metal sleeve 3 and 4.

Figure 21:
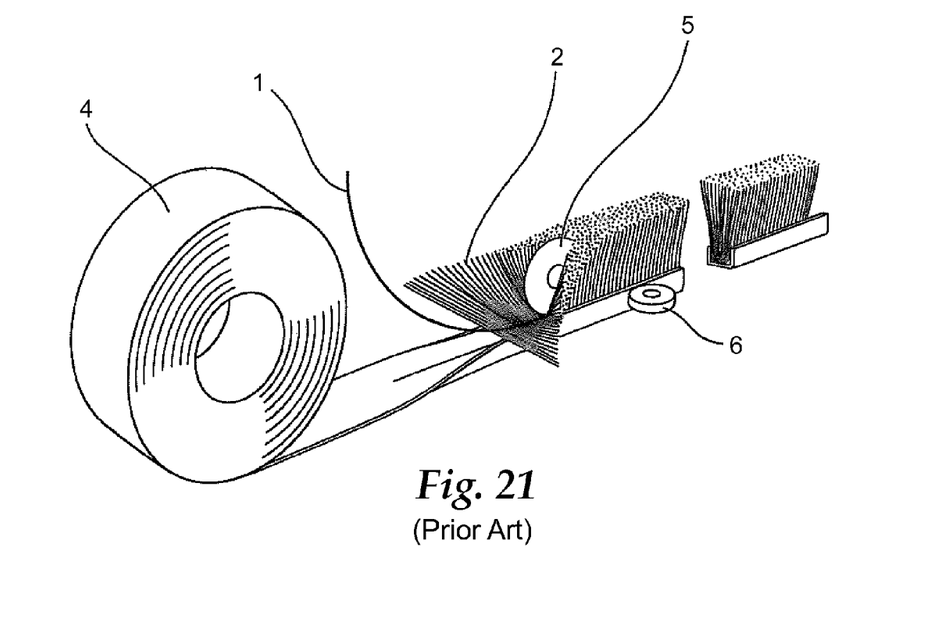
FIG. 21 is a schematic view showing an example of a process for producing the linear abrasive brush member.

FIG. 21 is a schematic view showing an example of a process for producing a linear abrasive brush member. A core 1 is placed on the center of fibers 2. A roller 5 presses the core 1 to fold the fibers 2 and simultaneously inserts the fibers 2 into a metal sleeve 4. The folded part of the fibers 2 is fastened together with the metal sleeve 4 from both sides with a knurling tool 6, thereby being fixed.

A linear abrasive brush member comprises a long, thin substrate part to which filaments are fixed and a plurality of filaments which project from a side surface of the long, thin substrate part in about parallel. An abrasive brush is produced by deforming the linear abrasive brush member or fixing the substrate part thereof to a properly shaped supporting member. The supporting member used is, for example, a cylindrical shape or a disk shape.

However, there are the following problems in conventional linear abrasive brush members. Since fibers are fastened with a metal sleeve by caulking, filaments tend to break due to application of load on the caulked part. The production requires complicated works and a large cost because the number of constituent parts is large. Abrasion ability is weak because filaments are thin and cylindrical.

Japanese Patent Kohyo Publication No. 2001-502185 (WO96/33638) discloses, as other conventional examples, an abrasive brush and abrasive brush member comprising a substrate part and filament parts integrally molded from a composition containing a thermoplastic elastomer as a major component. A plurality of the abrasive brushes are usually layered and used as an abrasive brush.

Japanese Patent Kohyo Publication No. 2001-502185 (WO96/33638) discloses that a wheel-shaped abrasive brush or a disk-shaped abrasive brush is fabricated using the integrally molded abrasive brush members as a part.

In Japanese Patent Kohyo Publication No. 2001-502185 (WO96/33638), abrasive brush members are molded while their dimensions or shapes are determined in advance so as to be commensurate with driving members or supporting members to which they are mounted. In such abrasive brush members, when it becomes necessary to change the external shape or dimensions of an abrasive brush fabricated, the dimensions or shape of the abrasive brush members should be changed first and a metal mold have to be redesigned and produced again. Therefore, abrasive brushes using the abrasive brush members integrally molded from a resin require much labor and costs for changing their external shapes or dimensions.

U.S. Pat. No. 3,233,272 discloses an abrasive brush member comprising a substrate part and filament parts integrally molded from flexible plastics. The material of the abrasive brush member disclosed in patent document 2 is not a thermoplastic elastomer and thus is insufficient in elasticity. Therefore, the filament parts are easily broken and the substrate part is inferior in deformability. The substrate part is insufficient in strength, and is inferior in safety for using high-speed rotational abrasive brushes.

Japanese Patent Kohyo Publication No. 2001-502185 (WO96/33638) and U.S. Pat. No. 3,233,272 disclose that a wheel-shaped abrasive brush or a disk-shaped abrasive brush is fabricated with integrally molded abrasive brush members as a part.

SUMMARY OF THE INVENTION

It is desired to provide a linear abrasive brush member which is hardly broken in production or use, in which the substrate part is excellent in deformability, and an abrasive brush is easily provided in a variety of sizes and shapes using the linear abrasive brush member.

The present invention provides a linear abrasive brush member comprising:
an embedded core material;
a rod-shaped substrate part having opposite long-narrow upper and bottom faces; and
a plurality of filament parts present on the upper surface along the longitudinal direction; and
the substrate part and the filament parts being integrally molded from a resin composition.

The present invention provides an abrasive brush comprising:
the linear abrasive member; and
a supporting member having a surface on which the linear abrasive member is fastened.

The present invention further provides a method for preparing the linear abrasive brush member comprising:
(1) preparing a metal mold which has a convex part corresponding to the shape of the linear abrasive brush member and a predetermined longitudinal size, and a core material;

(2) opening the metal mold and placing the core material in the convex part along the ditch corresponding to the substrate part shape of the linear abrasive brush member;
(3) closing the metal mold and integrally molding a resin composition to obtain a molded body;
(4) opening the metal mold, and releasing and moving the molded body in the longitudinal direction so that an end part of the molded body is left in the metal mold and that the core material is placed in the convex part along the ditch corresponding to the substrate part shape of the linear abrasive brush member; and
(5) repeating the steps (3) and (4).

The substrate part of the linear abrasive brush member of the present invention is excellent in deformability. It therefore is possible to easily provide a wheel-shaped abrasive brush or a disk-shaped abrasive brush by bending the brush member along a properly shaped supporting member. Moreover, since the brush member is linear, its length has a high degree of freedom, and it is possible to change the external shape or dimensions of an abrasive brush freely. The substrate part has a core material which affords sufficient strength, and the linear abrasive brush member is hardly broken as production or use. In addition, the filament parts are molded and not oriented, and are hardly broken and excellent in abrasion ability.

DETAILED DESCRIPTION OF THE INVENTION

Figure 1:
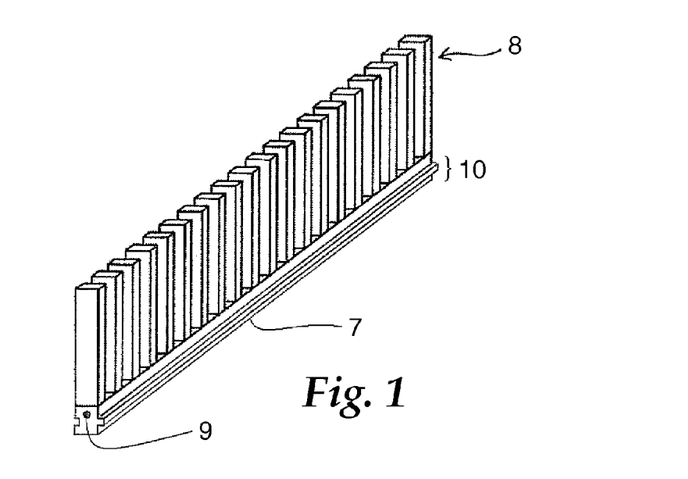
FIG. 1 is a perspective view showing an example of a linear abrasive brush member of the present invention.

FIG. 1 is a perspective view showing an example of the linear abrasive brush member of the present invention. A plurality of filament parts 8 are fixed, aligning about parallel at about regular intervals to a rod-shaped substrate part 7. The substrate part 7 has an upper face and a bottom face which are opposite and long-narrow shape. A plurality of filament parts are present on the upper face along the longitudinal direction. A core material 9 is embedded in the substrate part 7 throughout the longitudinal direction. A filament part 8 has an oblong shape with a thickness.

Figure 2A:
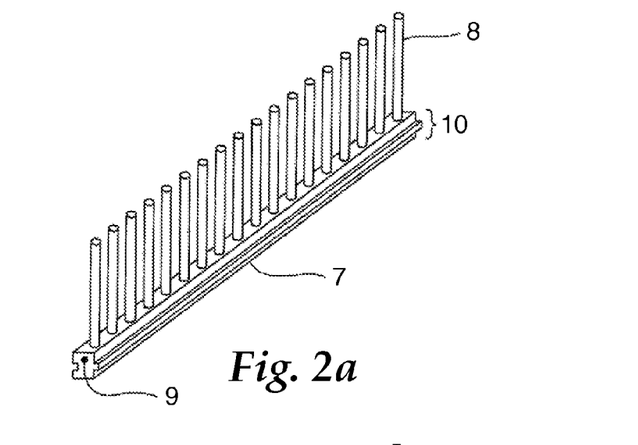
FIGS. 2a and 2b are perspective views showing other examples of a linear abrasive brush member of the present invention.
Figure 2B:
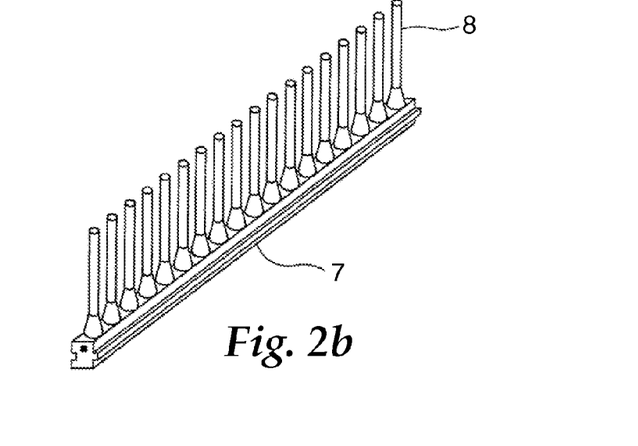

FIG. 2 is a perspective view showing an example of the linear abrasive brush member of the present invention. FIG. 2 (a) shows filament parts of cylindrical shape, and FIG. 2 (b) shows filament parts of cylindrical shape with taper in part. These also have a core material 9 embedded in the substrate part 7 throughout the longitudinal direction.

The substrate part is a member that fixes filaments by gathering them at one end so as to prevent the individual filaments from separating. The shape of the substrate part is a long and narrow line or rod. Such shapes make an abrasive brush member easy to be deformed and result in a high degree of freedom in shape. As a result, it is possible to fasten abrasive brush members along the surfaces of supporting members in various shapes and to constitute abrasive brushes with a wide variety of shapes easily.

In order to unite the substrate part to each other, the substrate part 7 may have a mating structure 10 such as a groove or mesa (i.e., linear projection) along the longitudinal direction.

A shape of the cross section perpendicular to the longitudinal direction of the substrate part, is not particularly restricted and may be, for example, a circle, ellipse, square, triangle, rectangle, polygon or combined ellipse (e.g., triellipse and tetraellipse). A cross-sectional area of the cross section of the substrate part is, for example, 2 to 100 mm$^2$, preferably 5 to 30 mm$^2$, and more preferably from 10 to 20 mm$^2$.

An object for putting a core material into a substrate part is to improve the abrasive brush in durability so that the substrate part is not broken when the abrasive brush is produced and used.

It is preferred that the core material has a tensile-breaking strength of not less than 5 kg, preferably not less than 10 kg when the linear abrasive brush member is required to have a tensile-breaking strength of not less than 5 kg, preferably not less than 10 kg so that the core material be designed to resist against external forces subjected to the linear abrasive brush member.

That is, it is preferred that the core material is designed to have a tensile-breaking strength of not less than that of a core-less linear abrasive brush member, to resist against external forces subjected to the linear abrasive brush member.

The core material is selected from linear materials excellent in tensile-breaking strength and flexibility which have heat resistance not degraded with temperatures during molding. Specific examples of the core material include metal lines, wires, cotton threads and carbon fibers. A thickness of the core material is about 5 to 50% in cross-sectional area in the cross section of the substrate part perpendicular to the longitudinal direction. If the core material is too thick, flexibility is deteriorated, whereas if too thin, a reinforcing effect is reduced. By using a core material with constitution of stranded wires, the linear abrasive brush member is further improved in mechanical properties such as bending property.

Figure 4:
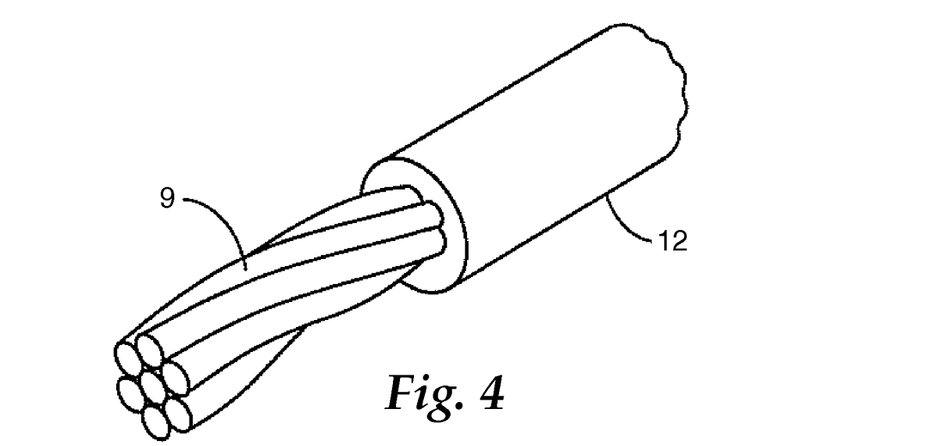
FIG. 4 is a schematic view showing structure of a resin coated core material.

The core material may be subjected to surface treatment in advance such as resin coating so that the core material is improved in adhesiveness to a resin of the substrate part. FIG. 4 is a schematic view showing structure of a core material coated with resin. A core material 9 is coated with a resin layer 12.

The filament parts generally have an aspect ratio of at least 2, more generally at least 5, more typically at least 10, and most typically at least 20. The aspect ratio is defined as a value produced by dividing the length by the average width.

The filament parts may have any length or width depending on its use of the abrasive brush, and the shape of the section (section perpendicular to the longitudinal direction) may be, for example, a circle, ellipse, square, triangle, rectangle, polygon or combined ellipse (e.g., triellipse and tetraellipse).

The cross-sectional area of the cross section of a filament part is generally 0.5 to 100 mm$^2$, typically 2 to 50 mm$^2$, and more typically 5 to 20 mm$^2$. The cross-sectional area does not have to be specified to one value. The length of a filament part is generally 10 to 100 mm, typically 20 to 70 mm, and more typically 30 to 50 mm.

Figure 3:
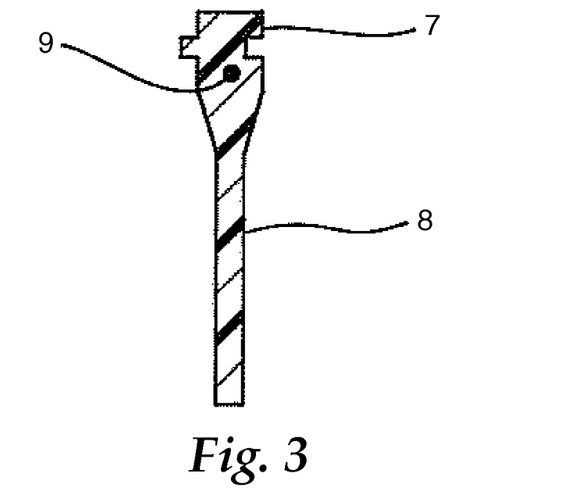
FIG. 3 is a cross-sectional view showing an example of the shape that a substrate part and a filament part are put together.

FIG. 3 is a cross-sectional view showing an example of the shape that a substrate part and a filament part are put together. The cross-section shows that a linear abrasive brush member is cut with a face perpendicular to the longitudinal direction at a point where a substrate part 7 is combined with a filament 8. A core material 9 is embedded in the substrate 7.

When the abrasive brush is shaped such that it is driven in a constant direction, such as a disk shape or a wheel shape, the cross sectional shape of a filament part is preferably a rectangle whose short sides are about parallel to the driving direction and the long sides are about perpendicular to the driving direction because the tip of a filament part comes into contact with a workpiece in a larger area and the abrasion ability increases.

Figure 19:
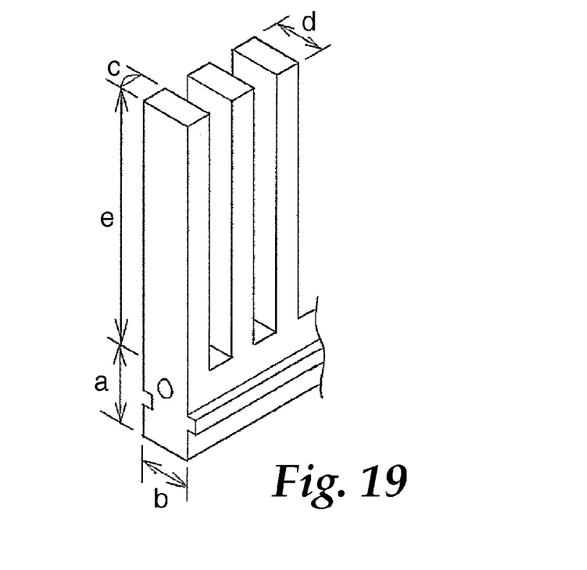
FIG. 19 is a partially enlarged perspective view of the linear abrasive brush member produced in an Example.

In order to make the sectional shape of filament parts be such a rectangle, it is preferable to make the external shape of each filament be about oblong with thickness. FIG. 19 is a partially enlarged perspective view of a preferred linear abrasive brush member which has filament parts with oblong external shape. The filament thickness c in its external shape corresponds to the short side length of the filament section. The short side length d of the oblong in the external shape of a filament corresponds to the long side length of the filament section. The long side length e of the oblong in the external shape of a filament corresponds to the filament part length.

In the preferable example, the external shape of the filament parts is characterized in that a ratio of the long side length e to the short side length d of the oblong is from 2 to 30, preferably 5 to 20, and a ratio of the short side length d to the thickness c is from 0.1 to 15, and preferably 0.2 to 8.

Regarding a specific example of dimensions of the external shape of the filament parts, a thickness c is from 0.2 to 3 mm, preferably from 0.3 to 2 mm, and more preferably from 0.5 to 1.5 mm. A short side length d of the oblong is from 0.2 to 30 mm, preferably from 0.5 to 20 mm, and more preferably from 1 to 15 mm. A long side length e of the oblong is from 0.5 to 100 mm, preferably from 1 to 60 mm, and more preferably from 5 to 40 mm.

The linear abrasive brush member of the present invention is produced by integrally molding from a resin composition, generally a thermoplastic resin composition, preferably a resin composition containing thermoplastic elastomer as a major component. The term "major component" as used herein means a component whose content is more than 50% by weight. By using thermoplastic elastomer, the whole abrasive brush member including filament parts has elasticity, easy deformability, and thus, increased degree of flexibility in shape. By molding integrally with a substrate part, the filament parts are hardly broken at joints of the substrate part. Moreover, the component parts are few and therefore the production work is simple. As a result, it is possible to produce tough, well-deformable linear abrasive brush members at low costs.

Desirable thermoplastic elastomers typically have a Shore D durometer hardness at room temperature of at least about 30, more typically from about 30 to about 90 determined in accordance with ASTM D790.

A method of integral molding is preferably injection molding. Generally, a thermoplastic elastomer, which is a raw material, is heated to at least its melting point where the thermoplastic elastomer can flow. Subsequently, if necessary, abrasive particles or additives usually used are mixed into the thermoplastic elastomer to form a resin composition. The resin composition is introduced into a metal mold having therein a vacant space with a specified shape.

Thus, the resin composition flows into the vacant space in the metal mold and the shape of a linear abrasive brush member is formed. Subsequently, the resin is cooled to solidify and a molded linear abrasive brush member is taken out from the metal mold. The resulting linear abrasive brush member has a substrate part and filament parts molded integrally, and is tough and flexible.

When the resin composition is introduced into the metal mold, a core material is put in the substrate part. If no core is put in, the substrate part is easily broken, and durability of the abrasive brush may decrease.

The linear abrasive brush member of the present invention is not specified nor limited in longitudinal size. A metal mold employed for producing it is however has limitation in longitudinal size. FIG. 5 is a process diagram showing a method for producing a linear abrasive member having no limitation in longitudinal size with a metal mold having a predetermined longitudinal size.

Figure 5A:
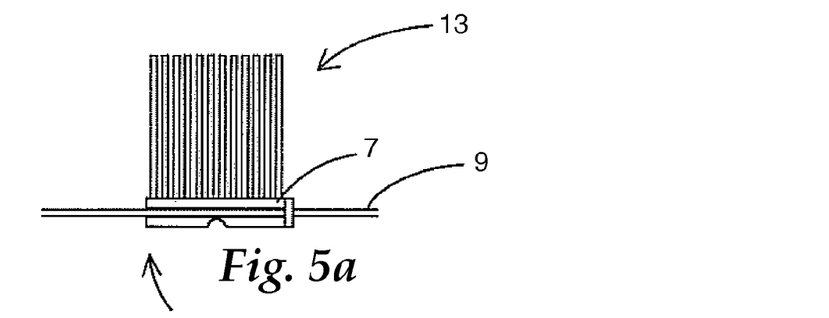
FIG. 5a-5d are process diagrams showing a method for producing a linear abrasive member having no limitation in longitudinal size with a metal mold having a predetermined longitudinal size.
Figure 5B:
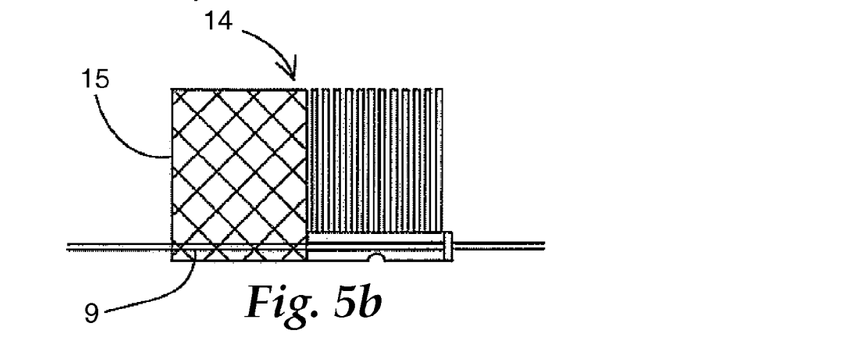

A core material is placed in the convex part of the metal mold along the ditch corresponding to the substrate part shape of a linear abrasive brush member, and a resin composition is injection molded. The mold is opened with releasing to obtain a molded body 13 which has a core material 9 embedded in the substrate part 7 as shown in FIG. 5 (a). The molded body is then moved in the longitudinal direction. In the step, the end part 14 of the molded body is left in the metal mold 15 and the core material 9 is placed in the convex part of the metal mold along the ditch corresponding to the substrate part shape of the linear abrasive brush member.

Figure 5C:
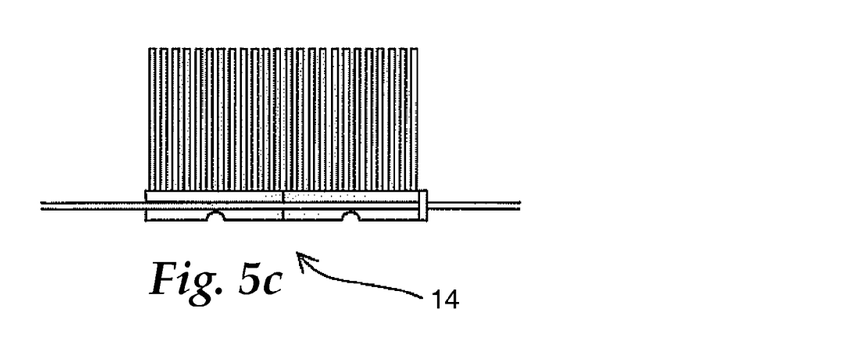
Figure 5D:
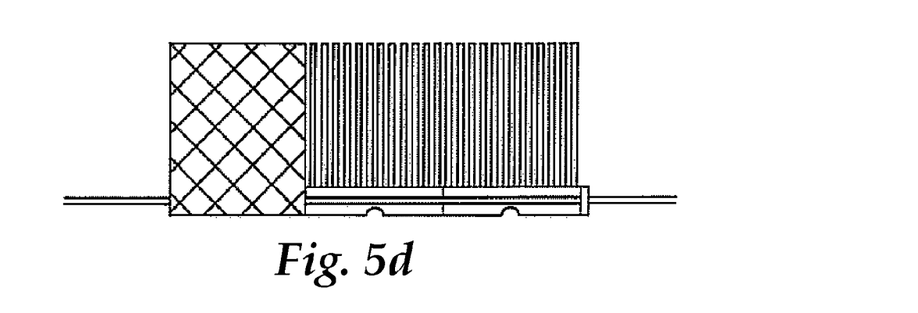

A resin composition is injection molded again. The metal mold is opened with releasing to obtain a molded body extended in longitudinal size connected at the end part 14 as shown in FIG. 5 (c). The steps of that the molded body is moved in the longitudinal direction and that a resin composition is injection molded, are repeated thereafter to obtain a linear abrasive member having no limitation in longitudinal size.

Examples of the thermoplastic elastomer include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

Preferable thermoplastic elastomers are described in more detail in, for example, Japanese Patent Kohyo publication No. 2001-502185, page 45, line 7 from the bottom to page 50, line 6, or the specification of Japanese patent No. 3676804, page 8, line 3 to page 12, line 40, which are incorporated herein by reference.

If needed for increasing the abrasion ability of filament parts, abrasive particles are incorporated into the resin composition. The resin composition may contain appropriate amounts of generally used lubricants, coupling agents, fillers, abrasion aids, etc.

The amount of the abrasive particles is adjusted so that the weight ratio of the abrasive particles to the resin is from 0.25 to 1, and preferably from 0.4 to 0.8. When the amount of the abrasive particles is more than 1, the abrasive particles are more than the resin, and therefore the strength of the filament parts decreases and the life of brushes become short.

Generally, abrasive particles are scattered so as to form a distribution in which the abrasive particles are substantially fully dispersed, however, that is not requisite. While most abrasive particles are completely embedded in the resin, this does not exclude possibility of partial exposure of particles on the surface to the outside of the resin.

Examples of the abrasive particles include particles of molten aluminum oxide, thermally-treated molten aluminum oxide, ceramic aluminum oxide, heat-treated aluminum oxide, silicone carbide, titanium diboride, aluminum zirconia, diamond, boron carbide, ceria, cubic boron nitride, particles of garnet and particles of combinations of the foregoing.

Abrasive particles generally have a particle diameter within the range of from about 0.1 to about 700 μm. The particle diameter is typically from about 5 to about 300 μm, and more typically from 10 to 200 μm. For example, as shown in Table 1, the particle diameter of abrasive particles may be suitably adjusted according to intended uses or desired functions of an abrasive brush.

TABLE 1

| Application | Average particle diameter (μm) | JIS particle size |
| --- | --- | --- |
| Rough finishing | 180-60 | #80-#220 |
| Medium finishing | 60-12 | #220-#1000 |
| Medium finishing * | 30-15 | #400-#600 |
| Fine finishing | 12-0.1 | #1000-#25000 |
| Fine finishing * | 1-0.3 | #8000-#10000 |

* Desirable range

The linear abrasive brush member of the present invention can be combined with supporting members such as a shaft and a disk to provide abrasive brushes of various shapes. Preferred examples of the abrasive brushes are as follows.

Wheel Type Abrasive Brush

Figure 6:
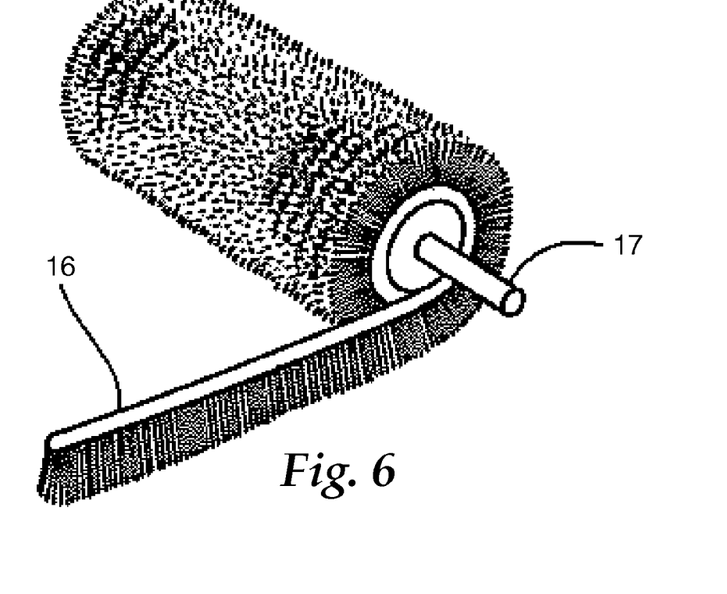
FIG. 6 is a perspective view schematically showing preparation process of a wheel type abrasive brush.
Figure 7:
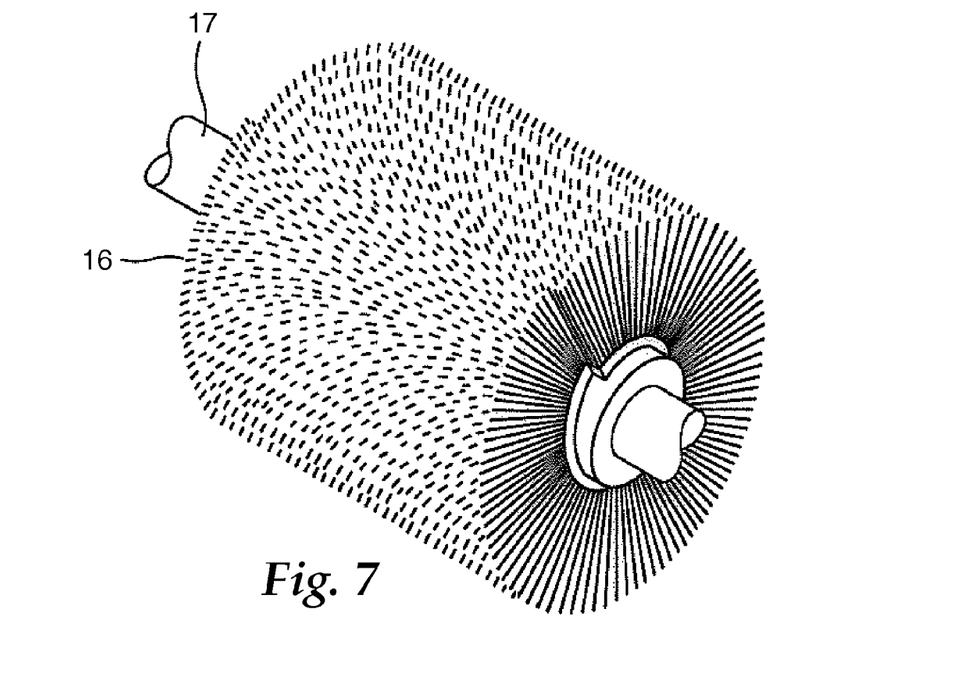
FIG. 7 is a perspective view of the resulted wheel type abrasive brush.

A wheel type abrasive brush is obtained with the linear abrasive brush member by spirally winding and fastening so that the substrate part becomes inner-ring part and that the filament parts become outer-ring part. FIG. 6 is a perspective view schematically showing preparation process of a wheel type abrasive brush. The linear abrasive brush member is fastened on the side face of a shaft 17 with the bottom face. FIG. 7 is a perspective view of the resulted wheel type abrasive brush.

Disk Type Abrasive Brush

Figure 8:
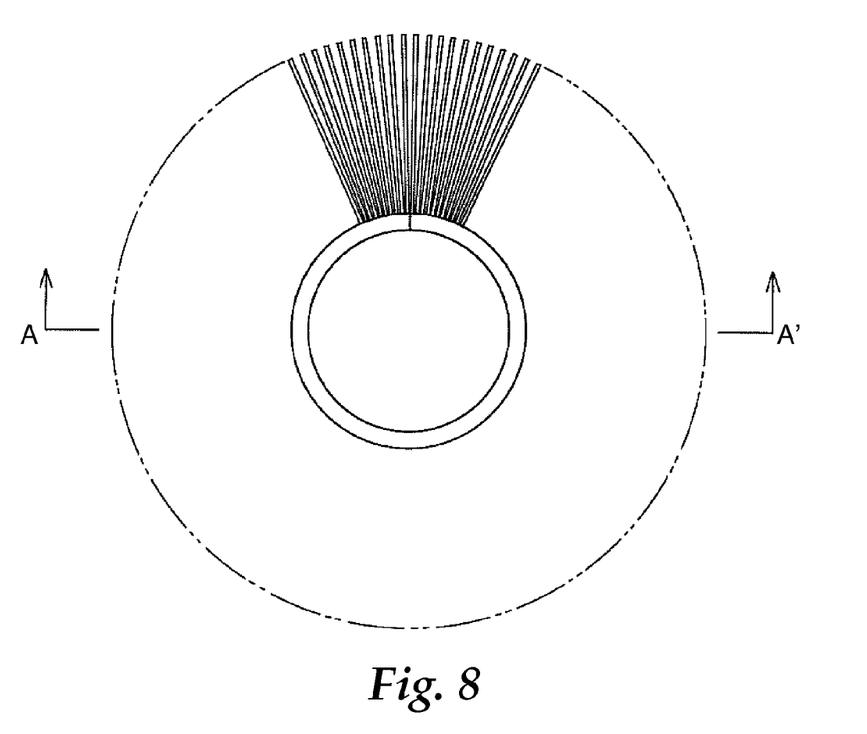
FIG. 8 is a plan view showing an example of a disk type abrasive brush.
Figure 9:
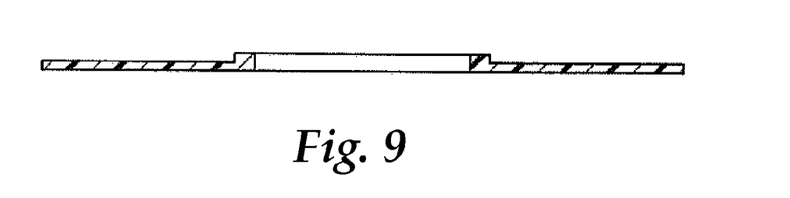
FIG. 9 is an AA' cross-sectional view of the disk type abrasive brush as shown in FIG. 8.

A disk type abrasive brush is obtained with the linear abrasive brush member by cutting to a piece of appropriate length, curling so that the substrate part becomes inner-ring part and that the filament parts become outer-ring part, and bonding the both ends. FIG. 8 is a plan view showing an example of a disk type abrasive brush. FIG. 9 is an AA' cross-sectional view of the disk type abrasive brush as shown in FIG. 8. The disk type abrasive brushes may be laid concentrically to constitute a wheel type abrasive brush.

Needlepoint Holder Type Abrasive Brush

Figure 10:
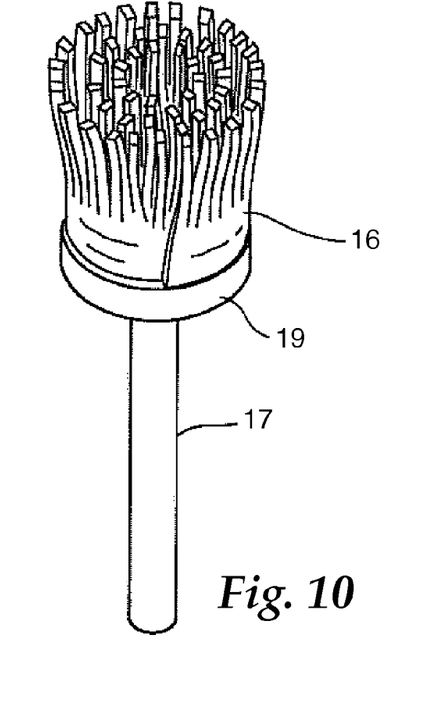
FIG. 10 is a perspective view showing an example of a needlepoint holder type abrasive brush.

A needlepoint holder type abrasive brush is obtained with the linear abrasive brush member by spirally winding and fastening so that the filament parts point around the same direction. FIG. 10 is a perspective view showing an example of a needlepoint holder type abrasive brush. A linear abrasive brush member 16 is fastened on a major surface of a supporting member 19 put at the tip of a shaft 17 with the bottom face. The linear abrasive brush member 16 may be fastened by directly winding up on the side face of the shaft 17 with the side face, in that case, no supporting member 19 is needed.

Figure 11:
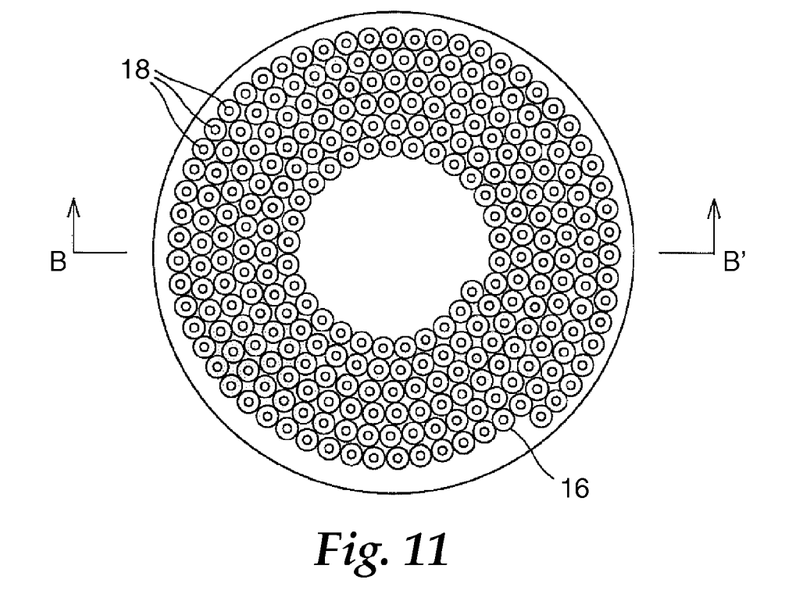
FIG. 11 is a perspective view showing another example of a needlepoint holder type abrasive brush.
Figure 12:
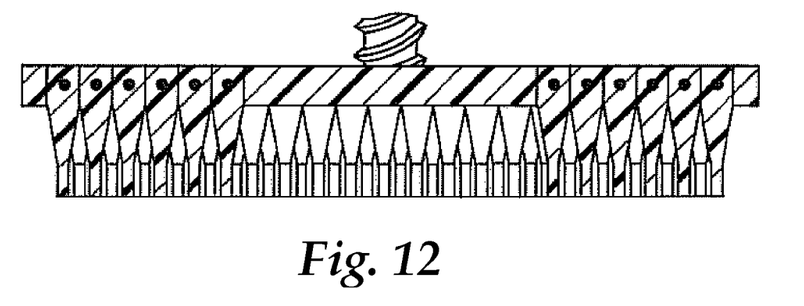
FIG. 12 is a BB' cross-sectional view of the needlepoint holder type abrasive brush as shown in FIG. 11.

FIG. 11 is a plan view showing another example of a needlepoint holder type abrasive brush. This figure shows the state that filament part tips 18 are up based on the paper surface. The linear abrasive brush member 16 is spirally wound and fastened. FIG. 12 is a BB' cross-sectional view of the needlepoint holder type abrasive brush as shown in FIG. 11.

Figure 13:
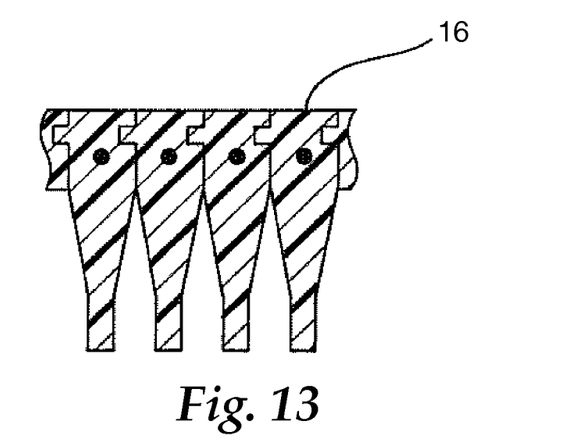
FIG. 13 is a partial sectional view showing an example of the state that a linear abrasive brush member is fastened.
Figure 14:
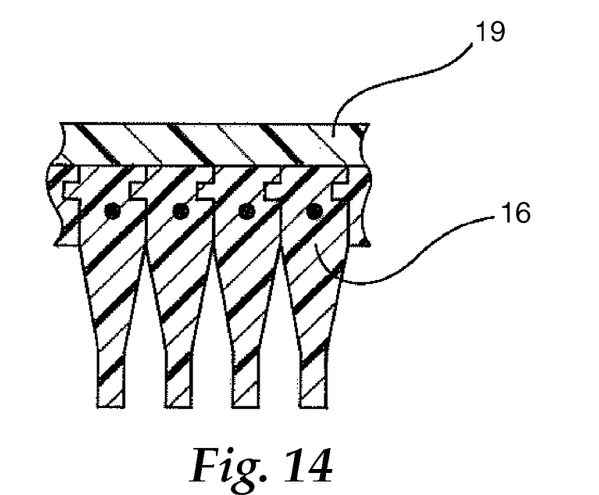
FIG. 14 is a partial sectional view showing another example of the state that a linear abrasive brush member is fastened.

The linear abrasive brush may be fastened by bonding the side faces each other, or by bonding to a plan supporting member with the bottom face. FIG. 13 is a partial sectional view showing an example of the state that a linear abrasive brush member is fastened. The linear abrasive brush member 16 is mated and bonded at side faces. FIG. 14 is a partial sectional view showing another example of the state that a linear abrasive brush member is fastened. The linear abrasive brush member 16 is bonded to a plan supporting member 19 with the bottom face.

Figure 15:
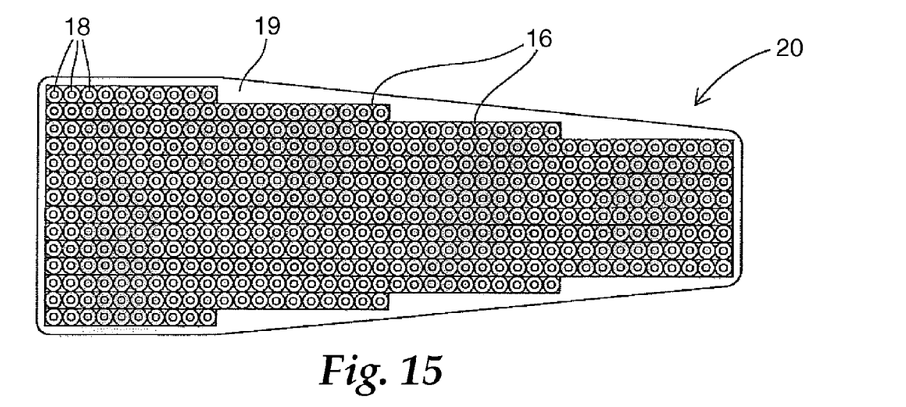
FIG. 15 is a plan view showing another example of a needlepoint holder type abrasive brush.

FIG. 15 is a plan view showing another example of a needlepoint holder type abrasive brush. This figure shows the state that filament member tips 18 are up based on the paper surface. The linear abrasive brush members 16 are fastened to a plan supporting member 19 with the bottom face. The linear abrasive brush members 16 are cut to have appropriate length, and aligned so as to conform the supporting member 19 shape.

Figure 16:
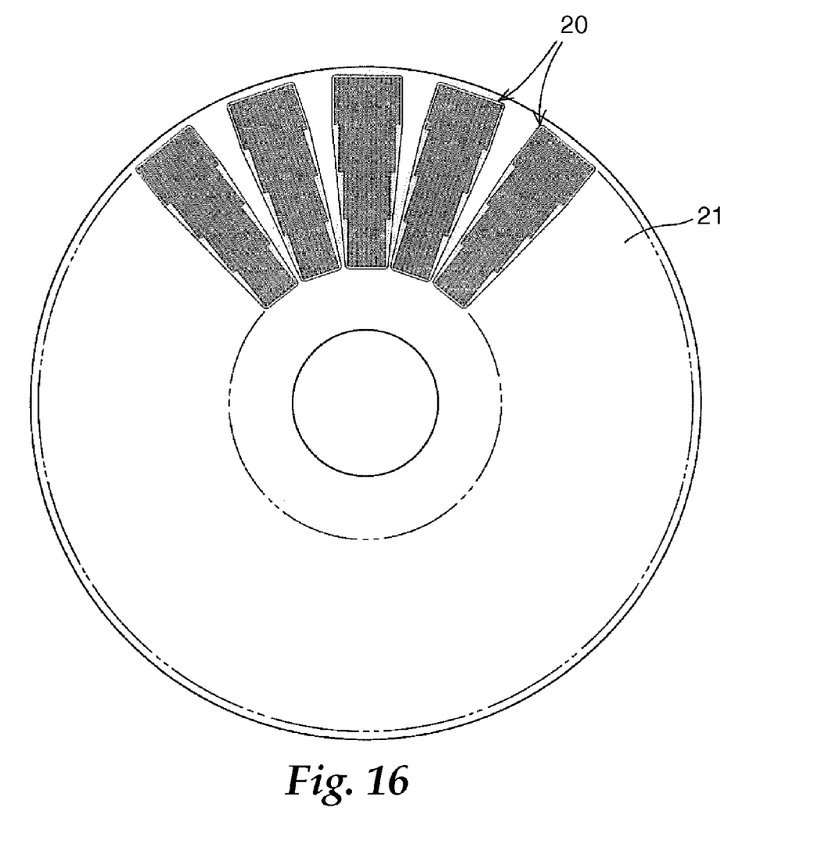
FIG. 16 is a plan view showing another example of a needlepoint holder type abrasive brush.

FIG. 16 is a plan view showing another example of a needlepoint holder type abrasive brush. This figure shows the state that filament member tips are up based on the paper surface. A plurality of needlepoint holder type abrasive brushes 20 as shown in FIG. 15 are fastened to a disk shape supporting member 21.

When an abrasive brush is produced using a linear abrasive brush member, a size of the abrasive brush can be easily adjusted by changing length of the linear abrasive brush member. Therefore, use of the linear abrasive brush member of the present invention makes it possible to produce abrasive brushes with a plurality of external sizes from a single kind of a linear abrasive brush easily and at low cost.

When abrasion is conducted using the abrasive brush, a motor or the like is attached first to the rotational center and then it is driven to rotate. Subsequently, filament parts are brought into contact with a workpiece under a load to rub it.

Figure 17:
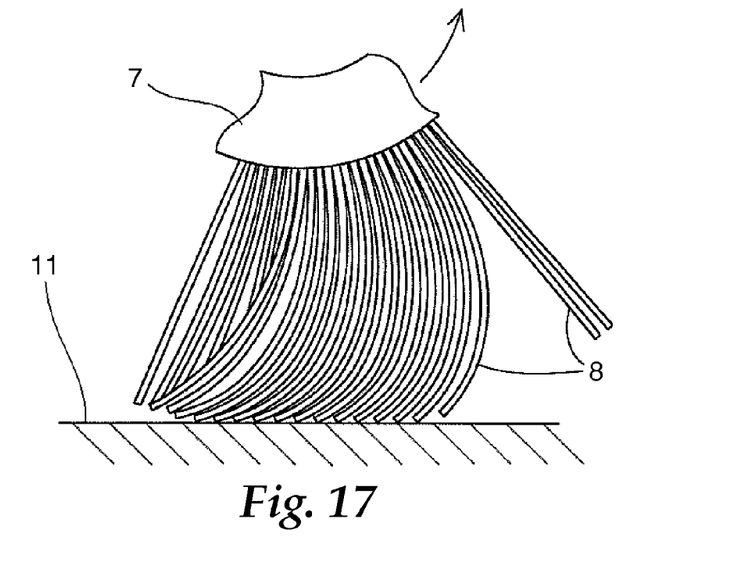
FIG. 17 is a schematic view showing the state that a wheel-shaped abrasive brush is rubbing a workpiece with filament parts.
Figure 18:
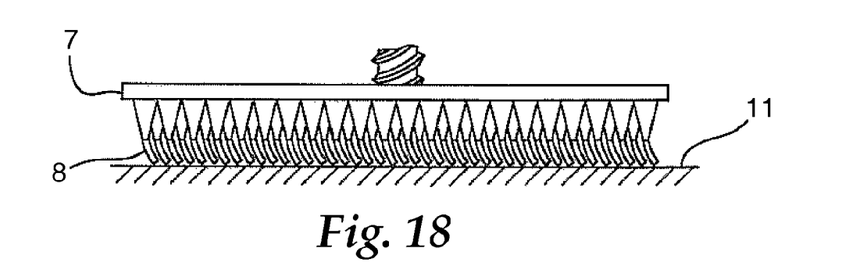
FIG. 18 is a schematic view showing a state that a needle-point holder-type abrasive brush is rubbing a workpiece with filament parts.

FIG. 17 is a schematic view showing the state that a wheel-shaped abrasive brush are rubbing a workpiece with filament parts. FIG. 18 is a schematic view showing a state that a needlepoint holder type abrasive brush are rubbing a workpiece with filament parts.

A filament part 8 is abound in flexibility and curves so that the side surface thereof comes into contact with a surface of the workpiece 11. The side surface of a filament part means the circumferential side surface of a pillar where the filament part 8 is considered as a pillar standing up on the substrate part 7.

When an abrasive brush rotates with the side surfaces of filament parts contact with a surface of a workpiece, the filament parts are pulled toward the direction of leaving from the substrate part due to friction with the workpiece. The filament parts, however, are excellent in tensile strength and therefore they do not leave nor break because they are molded integrally with the substrate part. Moreover, the filament parts are restored to their original states upon leaving from the surface of the workpiece because they are highly elastic.

The abrasion conditions are within a range which persons skilled in the art apply. Generally, a peripheral speed of a wheel-shaped abrasive brush is adjusted to about 10 to 3000 m/min with respect to a workpiece to be abraded. The cut-in is about 0.1 to about 5.0 mm.

The present invention is described in more detail in the following with reference to examples, but the invention is not limited thereto. All the amounts indicated in Examples are on weight basis. The values of dimensions or amounts should be interpreted not with strictness but with an appropriate allowance.

Example

A resin composition was prepared by mixing 100 parts of a thermoplastic elastomer ("HYTREL™ 5527" produced by du Pont Toray Co., Ltd.), 10 parts of an additive ("SILICONE BATCH™ BY 27010" produced by Dow Corning Toray Co., Ltd.). An injection molding method was conducted with the resin composition and cotton thread of 0.8 mm thickness as a core material to obtain a linear abrasive brush member in which each molded body unit from a metal mold is connected each other.

FIG. 19 is a partially enlarged perspective view of the linear abrasive brush member obtained. The section of the substrate part was about a rectangle, which had a length a of 5 mm and a width b of 3 mm. On one side surface of the substrate part, a groove with 1 mm-width and 1 mm-depth is formed along the longitudinal direction as a mating structure. A mesa that fits to the groove is formed on the other side surface. The external shape of each filament part is nearly an oblong having thickness. The thickness c is 1 mm, the short side length d is 3 mm, and the long side length e is 25 mm.

The resulted linear abrasive brush was tested as follows how much the bend freedom is.

Cylinders with curvatures of D50 mm, D40 mm, and D30 mm were prepared as supporting members, and the linear abrasive brush members were wound around the side surface of the respective cylinder so that the filament parts faced outside to prepare wheel type abrasive brushes. The wheel type abrasive brushes were visually inspected at the joints where each molded body unit from a metal mold is connected, and the conditions were evaluated. Table 1 shows the results.

Comparative Example

Linear abrasive brush members were produced, and wheel type abrasive brushes were prepared and evaluated, according to the same manner as described in the example except that no core material was employed. Table 1 shows the results.

TABLE 1

| Curvature of cylinder | Examples | Comparative Example |
| --- | --- | --- |
| D 50 mm | no trouble | no trouble |
| D 40 mm | no trouble | fracture at interface |
| D 30 mm | cracks at interface | fracture at interface |

The invention claimed is:

1. An abrasive brush of needlepoint holder type comprising:
    a linear abrasive brush member comprising:
        an embedded core material;
        a rod-shaped substrate part having opposite long-narrow upper and bottom faces;
        a plurality of filament parts present on the upper surface along the longitudinal direction; and, the substrate part and the filament parts being integrally molded from a resin composition;
    a supporting member having a surface on which the linear abrasive member is fastened; the supporting member is disk shape, and
    the linear abrasive brush member is spirally wound so that the filament parts point around the same direction, and that the bottom face is fastened to the major surface of the supporting member.

2. A method for preparing a linear abrasive brush member comprising:
    an embedded core material;
    a rod-shaped substrate part having opposite long-narrow upper and bottom faces;
    a plurality of filament parts present on the upper surface along the longitudinal direction; and
    the substrate part and the filament parts being integrally molded from a resin composition; the method comprising the steps of:
    (1) preparing a metal mold which has a convex part corresponding to the shape of the linear abrasive brush member and a predetermined longitudinal size, and a core material;
    (2) opening the metal mold and placing the core material in the convex part along the ditch corresponding to the substrate part shape of the linear abrasive brush member;
    (3) closing the metal mold and integrally molding a resin composition to obtain a molded body;
    (4) opening the metal mold, and releasing and moving the molded body in the longitudinal direction so that an end part of the molded body is left in the metal mold and that the core material is placed in the convex part along the ditch corresponding to the substrate part shape of the linear abrasive brush member; and
    (5) repeating the steps (3) and (4).

* * * * *